DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 240

T878,008
STORAGE OF WATER IN COATED LAYERS

John F. Padday, Nether Crutches, Jordans, Beaconsfield, England

Filed Feb. 16, 1970, Ser. No. 11,831
Int. Cl. G03c *1/48, 5/26, 5/54*
U.S. Cl. 96—29
No Drawing. 18 Pages Specification

A photographic product comprising a support, a silver halide layer and a discrete layer of a water-in-wax emulsion comprising a dispersed water phase and a dispersing wax phase, a plasticizer for said wax phase in order to prevent cracking and a surfactant. The emulsion is stable at the melting point of the wax. The wax emulsion can be coated contiguous to a photographic element or coated upon a non-absorbing support and contacted with a photographic element. Pressure or heat effects the release of water thereby initiating development of exposed photographic silver halide.

The wax phase comprises an animal, mineral or vegetable wax such as beeswax, paraffin wax, carnauba wax, azokerite wax, and the like; a plasticizer soluble in the wax such as paraffin oils having a boiling point of at least 100° C. The surfactants, for example, oleic acid, erucic acid and the like are hydrophilic at one end and hydrophobic at another end.

The water phase can be water alone which when released will induce initiation of development of a latent image in a photographic element having incorporated therein developers and activators or the water phase may be an aqueous developing solution, an aqueous solution of a silver halide solvent, and the like.

The silver halide emulsions and elements can be chemically sensitized, e.g., with noble metal sensitizers alone or in combination with sulfur or selenium sensitizers. They can contain spectral sensitizers, incorporated color forming couplers, incorporated developing agents, antifoggants, hardeners, plasticizers, coating aids and other suitable photographic addenda, such as described in U.S. Pat. 3,297,446 (columns 4–9).